US008225314B2

(12) United States Patent
Martins et al.

(10) Patent No.: US 8,225,314 B2
(45) Date of Patent: Jul. 17, 2012

(54) SUPPORT FOR PERSONAL COMPUTING IN A PUBLIC COMPUTING INFRASTRUCTURE BY USING A SINGLE VM DELTA IMAGE FOR EACH VM BASE IMAGE UTILIZED BY A USER

(75) Inventors: Fernando C. M. Martins, Hillsboro, OR (US); Michael Kozuch, Export, PA (US)

(73) Assignee: Intel Corporation, Santa Clara ( * ) Notice: Subject to any disclaimer, the term of this patent is extended or adjusted under 35 U.S.C. 154(b) by 1538 days.

(21) Appl. No.: 11/394,833

(22) Filed: Mar. 31, 2006

(65) Prior Publication Data

US 2007/0234356 A1   Oct. 4, 2007

(51) Int. Cl.
  *G06F 9/455* (2006.01)
(52) U.S. Cl. .......................................................... 718/1
(58) Field of Classification Search ....................... 718/1
  See application file for complete search history.

(56) References Cited

U.S. PATENT DOCUMENTS

| | | | | |
|---|---|---|---|---|
| 6,804,774 | B1 * | 10/2004 | Larvoire et al. | 713/2 |
| 7,356,679 | B1 * | 4/2008 | Le et al. | 713/1 |
| 7,577,722 | B1 * | 8/2009 | Khandekar et al. | 709/220 |
| 8,112,748 | B2 * | 2/2012 | Pomerantz | 718/1 |
| 2004/0205203 | A1 * | 10/2004 | Peinado et al. | 709/229 |
| 2005/0108709 | A1 * | 5/2005 | Sciandra et al. | 718/1 |
| 2005/0204013 | A1 * | 9/2005 | Raghunath et al. | 709/217 |
| 2005/0235045 | A1 * | 10/2005 | Narayanaswami et al. | 709/217 |

OTHER PUBLICATIONS

Kozuch, Michael. "Enterprise Client Management with Internet Suspend/Resume". Intel Technology Journal, vol. 8, Iss. 4, p. 313-323; Nov. 1, 2004.*

* cited by examiner

*Primary Examiner* — Meng An
*Assistant Examiner* — Brian Chew
(74) *Attorney, Agent, or Firm* — Barnes & Thornburg, LLP

(57) ABSTRACT

A method and system for support of personal computing in a public computing infrastructure. The system including a plurality of computers to be used by patrons of a public computing infrastructure. The system also includes one or more servers coupled to the plurality of computers via a network connection. Each of the plurality of computers includes a virtual machine monitor. The virtual machine monitor has a plurality of base virtual machine images, each of the base virtual machine images is customized for a particular hardware and software configuration representing a specific computing environment. The virtual machine monitor launches one of the plurality of base virtual machine images, arbitrates access to system resources via the launched virtual machine image, stores the changes in the state of the virtual machine image when a user terminates a session, and returns a computer to an appropriate state to enable the user to resume the terminated session in subsequent sessions.

34 Claims, 2 Drawing Sheets

SUPPORT FOR PERSONAL COMPUTING IN A PUBLIC COMPUTING INFRASTRUCTURE BY USING A SINGLE VM DELTA IMAGE FOR EACH VM BASE IMAGE UTILIZED BY A USER

BACKGROUND OF THE INVENTION

1. Field of the Invention

The present invention is generally related to the field of public computing infrastructures. More particularly, the present invention is related to a system and method for enabling a personal computing experience on a public computing infrastructure.

2. Description

A majority of people in the world today want access to personal computers (PCs) and the Internet, but cannot afford the cost of owning a personal computer (PC) or the cost of subscribing to an Internet service. One alternative for people that cannot afford to own an Internet-connected PC is a public computing infrastructure. Public computing infrastructures, like Internet Cafés and the like, are very popular solutions in emerging markets today.

The typical user experience in an Internet Café (iCafé) is poor when compared to a privately owned PC. For example, a user's personal preferences, preferred applications, and personal data are not available at login. The user has to rely on limited functionality of browser-based applications/services and carry personal data on a transportable medium. Media intensive usage models, such as, for example, audio, video, and photo collection, are impractical as they require users to carry and configure their own high capacity portable drives. To play a game, the user must carry the original compact disc (CD) so that it can be installed each time the user visits the Internet Café and the game status must be saved on a portable medium. In other words, a user is not able to keep anything persistent on the computer. These inconveniences limit the usage of public computers.

Operations of an Internet Café can be complex and offer the user very limited quality of service (QoS). For example, system operators cannot ensure that a public computer is safe after a user has finished a session. Software installations by a user, virus attacks, system file removal, etc. are just some of the events that may put a public computer in an unusable or unsafe state. Such events require frequent re-building of the public computers, which also reduces overall availability of the public computers.

Thus, what is needed is a system and method for enabling a user to have a personal computing experience in a public computing infrastructure, such as, for example, an iCafé or the like. What is also needed is a system and method for enabling a user of a public computing infrastructure to maintain a persistent state for later repeat use.

BRIEF DESCRIPTION OF THE DRAWINGS

The accompanying drawings, which are incorporated herein and form part of the specification, illustrate embodiments of the present invention and, together with the description, further serve to explain the principles of the invention and to enable a person skilled in the pertinent art(s) to make and use the invention. In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

While the present invention is described herein with reference to illustrative embodiments for particular applications, it should be understood that the invention is not limited thereto. Those skilled in the relevant art(s) with access to the teachings provided herein will recognize additional modifications, applications, and embodiments within the scope thereof and additional fields in which embodiments of the present invention would be of significant utility.

Reference in the specification to "one embodiment", "an embodiment" or "another embodiment" of the present invention means that a particular feature, structure or characteristic described in connection with the embodiment is included in at least one embodiment of the present invention. Thus, the appearances of the phrase "in one embodiment" or "in an embodiment" appearing in various places throughout the specification are not necessarily all referring to the same embodiment.

Embodiments of the present invention are directed to a system and method for enabling a user to have a personal computing experience in a public computing infrastructure. Embodiments of the present invention employ virtual machines in the client computers to support grid computing. The client computers use virtual machine monitors (VMMs) to implement virtual machine (VM) images and to restore the client computer to an appropriate state based on a user's configuration during the user's previous session using delta images that are stored on servers.

Although embodiments of the present invention are directed to iCafés, the invention is not limited to iCafé's. One skilled in the relevant art(s) would know that embodiments of the invention may also be applicable to any public computing infrastructure in which a user has the ability to maintain their personal computing environment on a client computer whenever the user patronizes the public computing infrastructure.

Figure 1:
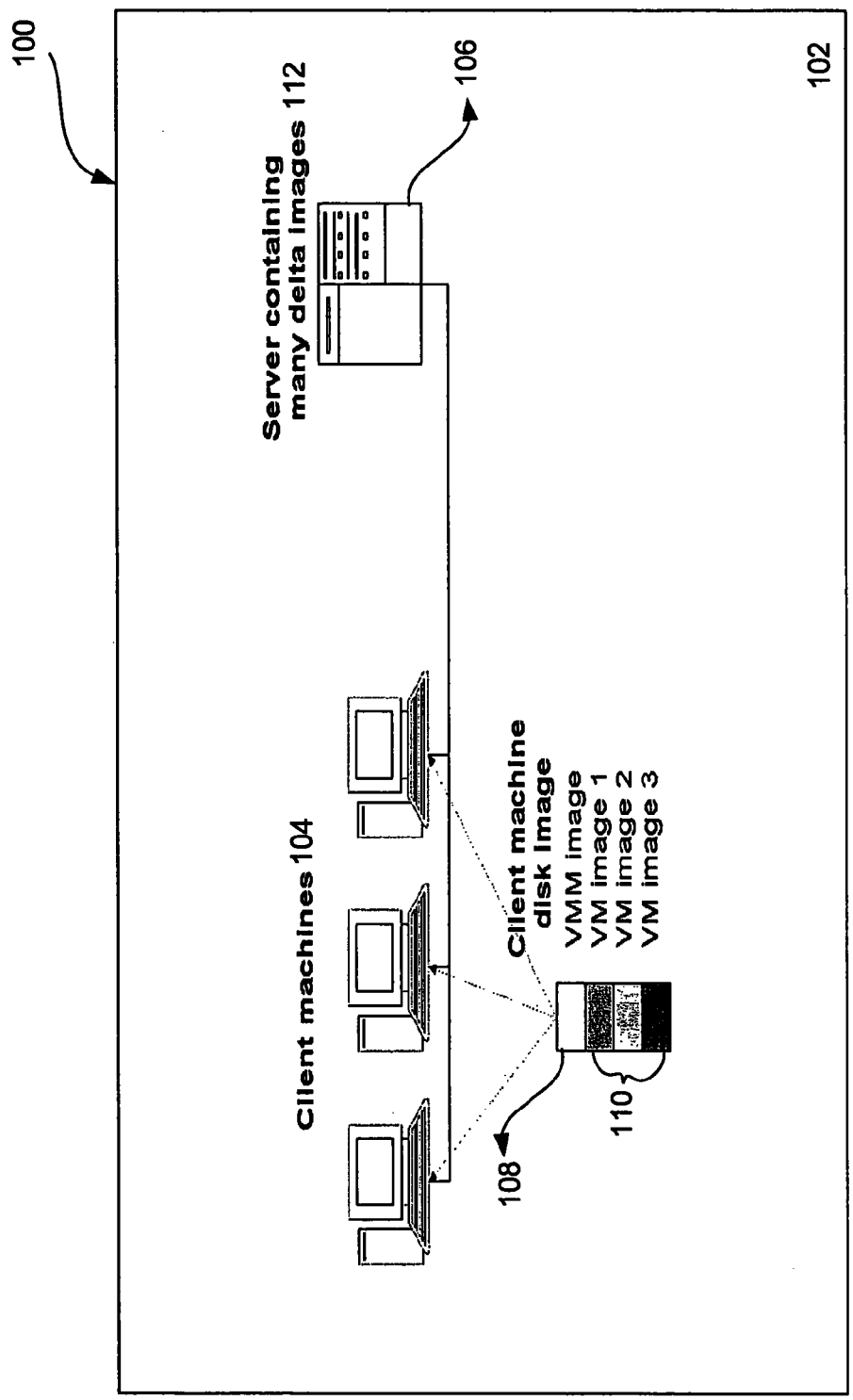
FIG. 1 is a block diagram illustrating an exemplary system for enabling a personal computing experience in a public computing infrastructure according to an embodiment of the present invention.

FIG. 1 is a block diagram illustrating an exemplary system 100 for enabling a personal computing experience in a public computing infrastructure according to an embodiment of the present invention. System 100 comprises a public computing infrastructure 102 having a plurality of computers 104 and one or more servers 106. Each of computers 104 are coupled to one or more servers 106 via a network connection (not shown). The network connection may be a wired or wireless network connection.

Computers 104 are client computers that may be used by patrons of public computing infrastructure 102. Each computer 104 comprises a virtual machine monitor (VMM) 108 that is capable of launching a plurality of canonical base-environment images referred to as virtual machine images 110. VMM 108 launches one of the virtual machine images 110 and arbitrates access to system resources. VMM 108 supports one virtual machine image 110 running at a time.

Each virtual machine image 110 is customized for a particular hardware/software configuration and represents a specific computing environment. For example, each virtual machine image 110 comprises an operating system and specific device drivers for devices in, or attached to, the computer 104 on which it is launched. For example, one virtual machine image 110 may comprise a Windows XP Operating System, developed by Microsoft Corporation, device drivers for devices such as, for example, a keyboard, a mouse, a graphics card, a network interface card, a printer, a hard drive, and a facsimile machine, and software, such as, but not limited to, Word, Access, and Power Point, all developed by Microsoft Corporation. Another virtual machine image 110 may comprise a Windows 2000 Operating System, developed by Microsoft Corporation, device drivers for devices such as, but not limited to, a keyboard, a mouse, a graphics card, a network interface card, a color printer, a scanner, and a hard drive, and software, such as WordPerfect. Yet another virtual machine image 110 may comprise a UNIX operating system such as, for example, Linux, device drivers for devices such as, but not limited to, a keyboard, a mouse, a graphics card, a network interface card, a color printer, a scanner, a hard drive, a CD (compact disc) drive, and a DVD (digital video disc) drive, and software that operates in a UNIX environment. Thus, virtual machine image 110 may include a combination of an operating system with one or more device drivers for the devices in, or attached to, computer 104, along with specific software packages that run on the operating system.

In an embodiment, one or more virtual machine images 110 may be stored directly on computer 104. In another embodiment, virtual machine images 110 may be stored on one or more servers 106. In yet another embodiment, virtual machine images 110 may be stored on a transportable medium, such as, for example, a compact disc (CD) or the like.

Access to physical devices on computer 104 is arbitrated by VMM 108. Devices that are critical to the proper execution of computer 104 or VMM 108 may be managed exclusively by VMM 108, and any accesses to these critical devices from virtual machine image 110 may be arbitrated by VMM 108. Critical devices may include, but are not limited to, programmable timers, interrupt controllers, and memory controllers. Similarly, access to devices that are shared by multiple virtual machine images 110 and/or VMM 108, such as printers, scanners, facsimile devices, shared hard drives, shared disc drives, etc., is arbitrated by VMM 108. Access to devices that are neither critical nor shared may either be arbitrated by VMM 108 or accessed directly by executable software in virtual machine image(s) 110. Such devices may include I/O (input/output) devices such as, but not limited to, a keyboard, a mouse, a graphics card, one or more unshared disc drives, and a network interface card (NIC).

One or more servers 106 store a virtual machine (VM) delta image 112 associated with each patron of public computing infrastructure 102. Delta images 112 represent the changes patrons have made to their base VM image 110 (i.e., the image that is launched when a patron logs into the system). Thus, for a new patron, delta image 112 is the virtual machine image 110 selected by the patron, which may be referred to as the base image. For a repeat patron, VM delta image 112 represents the changes the repeat patron made to his/her base image during the previous session, immediately before the patron placed computer 104 in a suspended or powered-down state. VM delta images 112 are small because they are recorded as differential updates with respect to the canonical VM image 110. The storage of VM delta images 112 allows system 100 to maintain a virtual personal computing environment in a public computer, such as computer 104, and keep that configuration over time and space.

In one embodiment, snapshots of a patron's personal environment may be saved at predetermined intervals. This enables a patron to retrieve a snapshot at a later time on the same computer 104 or on a different computer 104 for any reason.

A requirement for the software included in virtual machine image 110 is that it should support a mechanism for bringing computer 104 to a quiescent state upon user logout. Upon a user's request, the operating system could place the machine in a suspended state at the termination of a user's session. In one embodiment, the user may be required to bring computer 104 to a powered-down state. This state may be achieved by terminating the operating system in virtual machine image 110 or by causing the virtual machine environment to enter a suspend-to-disk or hibernation state.

In one embodiment, VMM 108 launches automatically when computer 104 is booted. In this instance, code corresponding to VMM 108 is resident on a hard disk on computer platform 104. In alternative embodiments, code corresponding to VMM 108 may be located on another medium, such as, for example, a Compact Disc Read-Only Memory (CD-ROM), firmware, network boot, etc. In this instance, when the medium containing the code is inserted into a device attached to computer 104 that is capable of reading the code, VMM 108 will be launched.

When a user requests that their environment be reconstructed on computer 104, wherein computer 104 is either the same computer utilized by their last session or computer 104 is another computer 104, VMM 108 returns the physical platform to the appropriate state. For example, if the user environment was placed in a suspended state, VMM 108 will return the platform to a state that is compatible with emerging from the suspended state. Alternatively, if the user environment was placed in a powered-down state, VMM 108 will start the user's computer 104 in an environment that is consistent with the computer that had been powered-down.

System 100 enables system administrators to ensure that a client configuration is always safe. Viruses, personal data, personal applications, etc. are encapsulated in a user's personal machine image and wiped from computer 104 before a new user logs onto computer 104.

In one embodiment, a user's state is kept for a limited or predetermined time to avoid storing unused data. In one embodiment, users may be required to come back to public computing infrastructure 102 within a predetermined time limit. For example, if a user has a stored delta image that has not been used for more than 60 days, the stored delta image for the user may be erased. In one embodiment, the user may be notified prior to erasing the stored delta image to give the user an opportunity to keep the delta image stored on the server. In one embodiment, a user may pay a nominal fee for storage of an unused state. The user may also save their state on a recordable medium during a prolonged absence from public computing infrastructure 102.

With embodiments of the present invention, an owner of public computing infrastructure 102 may be able to leverage system 100 to perform certain maintenance operations. For example, VMM 108 remains resident and privileged during a user's session, and can interrupt the user's session if unwanted activity is determined to be coming from the virtual machine environment. VMM 108 may also be used to enforce certain policies, such as, but not limited to, time limits on user sessions. When delta images are stored on one or more servers 106, offline processes may inspect them for viruses and take appropriate actions such as upgrading software, applying patches, and removing viruses. As a premium service, offline processes may also create checkpoints of the user delta images so that users can revert their environments to previous versions if their environment becomes corrupted through malicious software or by accident. Finally, the system administrator can clone environments upon request (to create identical gaming environments.

Figure 2:
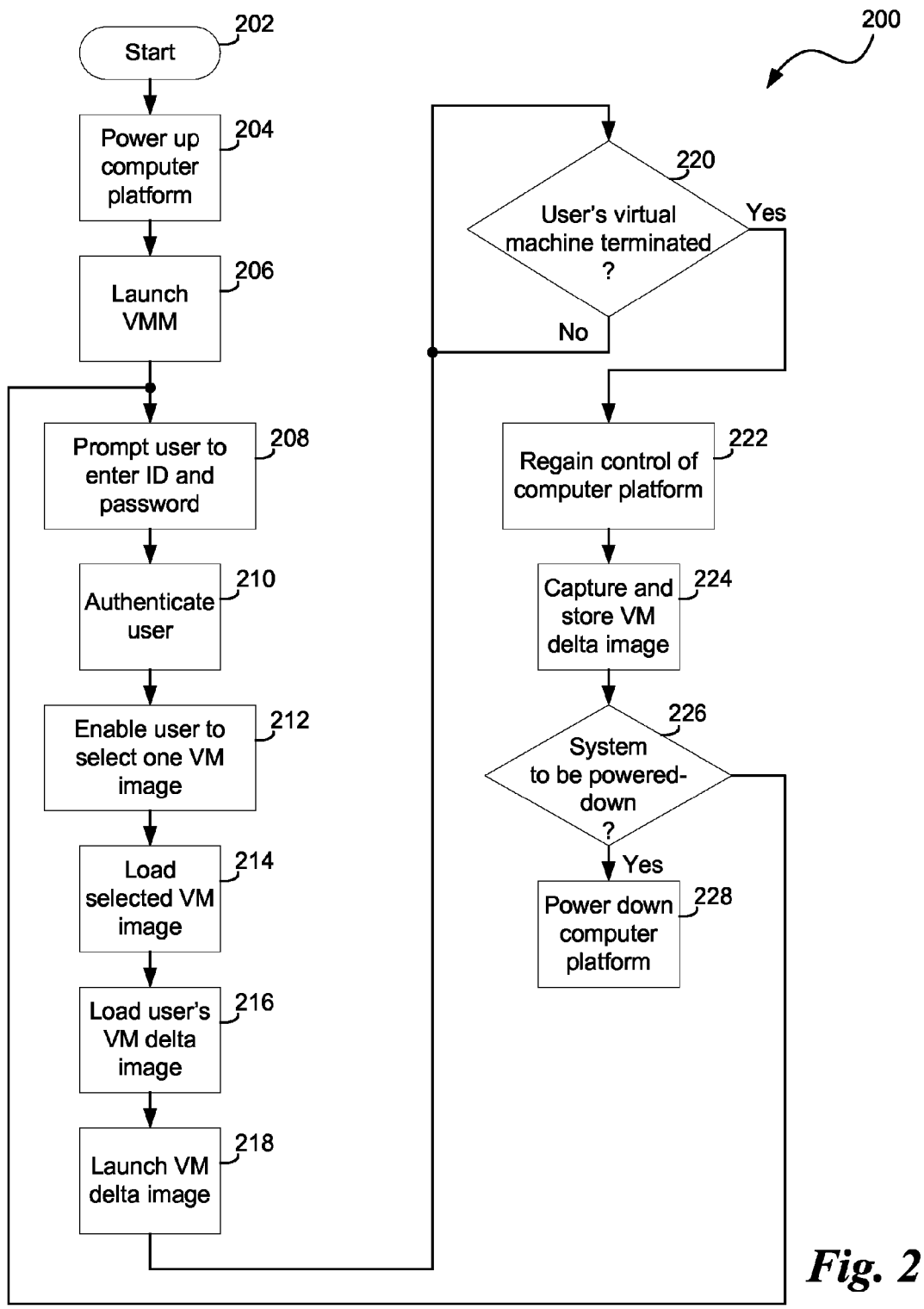
FIG. 2 is a flow diagram describing an exemplary method for enabling a personal computing experience in a public computing infrastructure according to an embodiment of the present invention.

FIG. 2 is a flow diagram 200 describing an exemplary method for enabling a personal computing experience in a public computing infrastructure according to an embodiment of the present invention. The invention is not limited to the embodiment described herein with respect to flow diagram 200. Rather, it will be apparent to persons skilled in the relevant art(s) after reading the teachings provided herein that other functional flow diagrams are within the scope of the invention. The process begins with block 202, where the process immediately proceeds to block 204.

In block 204, the computer platform is powered-on. Upon power-on, a virtual machine monitor (VMM) is launched (block 206). As previously indicated, the VMM is responsible for returning a computer platform to the appropriate state for a user of the system. In one embodiment, the code for the VMM may be resident on a hard drive on the computer platform. In alternative embodiments, the code for the VMM may be located on another medium, such as, for example, a CD-ROM, firmware, option ROM, FLASH memory device, network boot, etc. The process then proceeds to block 208.

In block 208, a user is prompted by a login screen to enter his/her user identification and password. Once the user identification and password has been entered, the user is authenticated (block 210). Authentication merely ensures that the user is who he or she claims to be, and is well known in the relevant art(s). The process then proceeds to block 212.

In block 212, once the user has been authenticated, the user is provided a menu of possible canonical virtual machine (VM) images from which to select a single VM image, most suitable for the user, for running on the VMM. As previously indicated, the VMM only supports one VM image running at a time. In one embodiment, the VM images are stored directly on the client computer. Each VM image represents a different computing environment that is customized for the particular hardware on the computer platform. For example, each VM image may represent a different operating system with the same device drivers or the VM images may contain the same operating system with different device drivers. Once the user has selected a VM image with an environment most suitable for the user, the process proceeds to block 214.

In block 214, the VMM loads the selected canonical VM image. The process then proceeds to block 216.

In block 216, the user's VM delta image will be retrieved from the server and loaded onto the computer platform. If the user is a new user, the VM delta image that will be retrieved from the server is a null image indicating that no changes are to be made to the VM image.

The VM delta image may only be loaded onto the computer after a user is authenticated to prevent providing a VM delta image to the wrong person. As previously indicated, VM delta images are recorded as differential updates with respect to the VM image and, therefore, are small. The process then proceeds to block 218.

In block 218, the VM delta image is launched. Launching the VM delta image enables the computer platform to be placed in a resume state. In other words, the computer platform has now resumed the state in which it was in prior to the user logging off the system during the user's previous session. A virtual machine for the user has now been completely established and the user may now resume execution of his/her session exactly where he/she left off previously. In the case of a new user, the new user may now start his/her session for the first time. At this point, the user's experience becomes a personal one. The user's personal preferences are loaded into the machine, giving the user the ability to perform activities on the computer as if it were his/her own personal computer. The process proceeds to decision block 220.

In decision block 220, it is determined whether execution of the user's virtual machine has terminated. To determine whether execution of the user's virtual machine has terminated, one must determine whether the user has requested termination of the operating system. For example, in the case of a Window's Operating System developed by Microsoft Corporation, if the user selects hibernate, shut down, or log off, the user is requesting that the virtual machine be terminated. If the user has not made a request to terminate execution of the user's virtual machine, the process remains at decision block 220 until the user makes a request to terminate execution of the user's virtual machine. If the user has made a request to terminate execution of the user's virtual machine, the process proceeds to block 222.

In block 222, the system regains control of the computer, and in block 224, the user's modifications to the VM image are captured. The VM delta image is associated with the VM image selected by the user and stored as a VM delta image. The process then proceeds to decision block 226.

In decision block 226, it is determined whether the user requested that the system be powered down. If the user requested that the system be powered down, the process proceeds to block 228, where the computer platform is powered down.

Returning to decision block 226, if the user did not request that the system be powered down, then the process proceeds back to block 208, where the computer platform waits for another user to log onto the computer.

Embodiments of the present invention may be implemented using hardware, software, or a combination thereof. The techniques described herein may find applicability in any computing, consumer electronics, or processing environment. The techniques may be implemented in programs executing on programmable machines such as mobile or stationary computers, personal digital assistants, set top boxes, cellular telephones and pagers, consumer electronics devices (including DVD (Digital Video Disc) players, personal video recorders, personal video players, satellite receivers, stereo receivers, cable TV receivers), and other electronic devices that may include a processor, a storage medium accessible by the processor (including volatile and non-volatile memory and/or storage elements), at least one input device, one or more output devices, and a network connection. Program code is applied to the data entered using the input device to perform the functions described and to generate output information. The output information may be applied to one or more output devices. One of ordinary skill in the art may appreciate that the invention can be practiced with various system configurations, including multiprocessor systems, minicomputers, mainframe computers, independent consumer electronics devices, and the like. The invention can also be practiced in distributed computing environments where tasks or portions thereof may be performed by remote processing devices that are linked through a communications network.

Each program may be implemented in a high level procedural or object oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hard-wired logic for performing the operations, or by any combination of programmed computer components and custom hardware components. The methods described herein may be provided as a computer program product that may include a machine accessible medium having stored thereon instructions that may be used to program a processing system or other electronic device to perform the methods. The term "machine accessible medium" used herein shall include any medium that is capable of storing or encoding a sequence of instructions for execution by the machine and that cause the machine to perform any one of the methods described herein. The term "machine accessible medium" shall accordingly include, but not be limited to, solid-state memories, optical and magnetic disks, and a carrier wave that encodes a data signal. Furthermore, it is common in the art to speak of software, in one form or another (e.g., program, procedure, process, application, module, logic, and so on) as taking an action or causing a result. Such expressions are merely a shorthand way of stating the execution of the software by a processing system to cause the processor to perform an action or produce a result.

While various embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined in accordance with the following claims and their equivalents.

What is claimed is:

1. A public computing system, comprising:
a plurality of computers to be used by patrons of a public computing infrastructure, wherein each of the plurality of computers includes a virtual machine monitor, each virtual machine monitor being associated with a plurality of base virtual machines images each representing a specific computing environment available to patrons of the public computing infrastructure;
one or more servers coupled to the plurality of computers via a network connection, wherein the one or more servers store, for a predetermined time period, a single delta image for each base virtual machine image utilized by a particular patron of the public computing infrastructure, the delta image representing one or more changes made to a base virtual machine image by the patron and recorded as a differential update with respect to the base virtual machine image utilized by the patron, wherein storage of the delta image allows the system to maintain a virtual personal computing environment for the patron in subsequent sessions, wherein a snapshot of the patron's personal computing environment is saved at predetermined intervals during a session to enable the patron to retrieve the snapshot at a later time or session, wherein each of the plurality of base virtual machine images are stored separate from each corresponding delta image;
wherein the virtual machine monitor to: (i) enable selection of one of the plurality of base virtual machine images by the patron and to launch the selected one of the plurality of base virtual machine images on one computer of the plurality of computers, (ii) retrieve the delta image corresponding to the patron and corresponding to the selected base virtual machine image from the one or more servers and modify the selected base virtual machine image of the one computer based on the retrieved delta image, and (iii) create a new delta image based on one or more changes made by the patron to the selected base virtual machine image upon a request by the patron to place the one computer in a suspended or powered-down state; and
wherein, in response to the patron subsequently re-selecting the previously selected base virtual machine image, the virtual machine monitor places the re-selected base virtual machine image of the one computer in a state equal to the state of the base virtual machine image previously used by the patron based on the new delta image and the selected based virtual machine image.

2. The system of claim 1, wherein the virtual machine monitor to support one base virtual machine image running at a time.

3. The system of claim 1, wherein each of the base virtual machine images to include an operating system and specific device drivers for each peripheral device in, or attached to, a computer on which a respective selected base virtual machine image is launched.

4. The system of claim 3, wherein peripheral devices comprise a keyboard, a mouse, a graphics card, a network interface card, a printer, a hard drive, a facsimile machine, a compact disc drive, and a digital video disc drive.

5. The system of claim 1, wherein each of the base virtual machine images includes an operating system, one or more device drivers for devices in, or attached to, a computer on which the selected base virtual machine image is launched, and one or more software packages capable of being executed on the operating system.

6. The system of claim 1, wherein the plurality of base virtual machine images is stored directly on each of the plurality of computers.

7. The system of claim 1, wherein the plurality of base virtual machine images is stored on a transportable medium.

8. The system of claim 1, wherein access to critical devices and shared devices in a network are arbitrated by the virtual machine monitor.

9. The system of claim 1, wherein access to devices that are neither critical nor shared are arbitrated by one of the virtual machine monitor or the selected base virtual machine image.

10. The system of claim 1, further comprising offline processes to inspect stored delta images for viruses, upgrade software, apply patches, and remove viruses.

11. The system of claim 1, further comprising offline processes to create checkpoints for a stored delta image to allow a corresponding patron of the stored delta image to revert a current version of the stored delta image to a previous version.

12. The system of claim 1, wherein if a computer platform utilized by the patron during a most recent previous use was placed in a suspended state during the most recent previous use, the virtual machine monitor to place a computer platform utilized by the patron during a current use into a state configured to emerge from the suspended state.

13. The system of claim 1, wherein if a computer platform utilized by the patron during a most recent previous use was placed in a powered-down state during the most recent previous use, the virtual machine monitor to place a computer platform utilized by the patron into a state that is compatible with emerging from the powered-down state.

14. The system of claim 1, wherein when the patron returns to the public computing infrastructure, the virtual machine monitor initializes the computing environment utilized by the patron to at least one of the snapshots of the patron's personal computing environment that was saved at the predetermined intervals.

15. The system of claim 1, wherein viruses, personal data, personal applications, and any other personal information generated on one of the plurality of computers during a user session by one of the patrons are encapsulated in a corresponding delta image and erased from the computer prior to another patron logging on to the computer.

16. The system of claim 1, wherein the virtual machine monitor to monitor a patron's session and to interrupt the session if unwanted activity is occurring.

17. A method for having a personal computing experience in a public computing infrastructure, comprising:

upon power-on of a computer platform in the public computing infrastructure, launching a virtual machine monitor on the computer platform;

prompting a user to logon to the computer platform;

enabling the user to select one of a plurality of canonical virtual machine images most suitable to the user, each of the canonical virtual machine images being customized for a particular hardware and software configuration representing a specific computing environment;

loading the selected canonical virtual machine image on the computer platform;

retrieving a virtual machine delta image for the user, the virtual machine delta image corresponding to one or more changes made by the user on the selected canonical virtual machine image, wherein a single virtual machine delta image is stored for each canonical virtual machine image utilized by the user;

modifying the selected canonical virtual machine image on the computer platform based on the retrieved virtual machine delta image;

determining whether the user has requested to terminate the selected canonical virtual machine image;

enabling a system controller to regain control of the computer platform by capturing modifications made to the selected canonical virtual machine image by the user;

storing the modifications made to the selected canonical virtual machine image in a new virtual machine delta image;

terminating the selected canonical virtual machine image;

enabling the user to re-select the previously selected canonical virtual machine image;

loading the re-selected canonical virtual machine image on the computer platform;

retrieving the new virtual machine delta image for the user; and modifying the re-selected canonical virtual machine image on the computer platform based on the retrieved new virtual machine delta image to place the re-selected canonical virtual machine image in a state equal to a previous state of the previously selected canonical virtual machine image prior to determining that the user requested to terminate the previously selected canonical virtual machine image, thereby establishing a virtual machine for the user to begin execution of a user session where the user left off at the user's most recent previous session and giving the user an ability to perform activities on the computer platform as if it were the user's own personal computer by establishing the user's personal computing environment on the computer platform.

18. The method of claim 17, wherein the virtual machine monitor is responsible for returning the computer platform to an appropriate state in subsequent sessions for the user.

19. The method of claim 17, wherein code for the virtual machine monitor is resident on a hard drive on the computer platform.

20. The method of claim 17, wherein code for the virtual machine monitor is located on a storage medium.

21. The method of claim 17, further comprising authenticating the user prior to enabling the user to select the canonical virtual machine image.

22. The method of claim 17, wherein each canonical virtual machine image represents a different computing environment that is customized for the particular software and hardware on the computer platform.

23. The method of claim 17, wherein if the user is a new user, the virtual machine delta image is a null image indicating that no changes are to be made to the selected canonical virtual machine image.

24. The method of claim 17, wherein if the user is a repeat user, the virtual machine delta image comprises a recording of differential updates with respect to the selected canonical virtual machine image from a most recent previous session of the user.

25. The method of claim 17, wherein terminating the selected canonical virtual machine image comprises powering down the computer platform.

26. The method of claim 17, wherein terminating the selected canonical virtual image comprises logging the user off of the computer platform and waiting for another user to log onto the computer platform.

27. The method of claim 17, further comprising erasing the user's virtual machine from the computer platform prior to enabling another user to log onto the computer platform.

28. An article comprising: a storage medium having a plurality of machine accessible instructions, wherein when the instructions are executed by a processor, the instructions provide for:

upon power-on of a computer platform in a public computing infrastructure, launching a virtual machine monitor on the computer platform;

prompting a user to logon to the computer platform;

enabling the user to select one of a plurality of canonical virtual machine images most suitable to the user;

loading the selected canonical virtual machine image on the computer platform;

retrieving a virtual machine delta image for the user the virtual machine delta image corresponding to one or more changes made by the user on the selected canonical virtual machine image, wherein a single virtual machine delta image is stored for each canonical virtual machine image utilized by the user;

modifying the selected canonical virtual machine image on the computer platform based on the retrieved virtual machine delta image;

determining whether the user has requested to terminate the selected canonical virtual machine image;

enabling a system controller to regain control of the computer platform by capturing modifications made to the selected canonical virtual machine image by the user;

storing the modifications made to the selected canonical virtual machine image in a new virtual machine delta image;

terminating the selected canonical virtual machine image;

enabling the user to re-select the previously selected canonical virtual machine image;

loading the re-selected canonical virtual machine image on the computer platform;

retrieving the new virtual machine delta image for the user; and modifying the re-selected canonical virtual machine image on the computer platform based on the retrieved new virtual machine delta image to place the re-selected canonical virtual machine image in a state equal to a previous state of the previously selected canonical virtual machine image prior to determining that the user requested to terminate the previously selected canonical virtual machine image, thereby establishing a virtual machine for the user to begin execution of a user session where the user left off at the user's most recent previous session and giving the user an ability to perform activities on the computer platform as if it were the user's own personal computer by establishing the user's personal computing environment on the computer platform.

29. The article of claim 28, wherein the virtual machine monitor is responsible for returning the computer platform to an appropriate state in subsequent sessions for the user.

30. The article of claim 28, further comprising instructions for authenticating the user prior to enabling the user to select the canonical virtual machine image.

31. The article of claim 28, wherein each canonical virtual machine image represents a different computing environment that is customized for the particular software and hardware on the computer platform.

32. The article of claim 28, wherein if the user is a new user, the virtual machine delta image is a null image indicating that no changes are to be made to the selected canonical virtual machine image.

33. The article of claim 28, wherein if the user is a repeat user, the new virtual machine delta image comprises a recording of differential updates with respect to the selected canonical virtual machine image from a most recent previous session of the user.

34. The article of claim 28, further comprising instructions for erasing the user's virtual machine from the computer platform.

* * * * *